June 22, 1926.  W. H. STURGEON, JR  1,590,130

HEADLIGHT

Filed April 30, 1923

W. H. Sturgeon Jr., INVENTOR

BY Victor J. Evans
ATTORNEY

WITNESS: Josephine D. Osborn.
Mary Lee Sykes

Patented June 22, 1926.

1,590,130

UNITED STATES PATENT OFFICE.

WILLIAM H. STURGEON, JR., OF PITTSBURGH, PENNSYLVANIA.

HEADLIGHT.

Application filed April 30, 1923. Serial No. 635,800.

This invention relates to automobile headlights, and more particularly to a headlight provided with anti-glare means.

One of the main objects of the invention is to provide a headlight of simple construction and operation which may be manufactured at low cost and can be quickly and easily assembled. A further object is to provide a headlight having a portion of its inner surface so treated or shaped as to effectually break up and disperse the light rays in such a manner as to prevent a blinding beam of light from being projected into the eyes of the driver of an approaching automobile. Further objects will appear from the detailed description.

In the drawings:—

Figure 1:
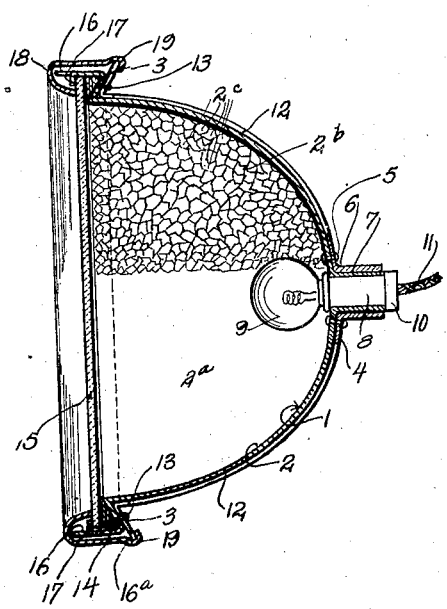
Figure 1 is a central sectional view through the headlight.
Figure 2:
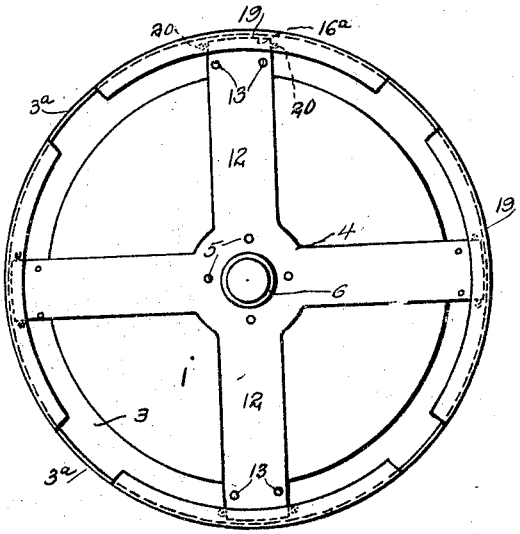
Figure 2 is a back view of the headlight.
Figure 3:
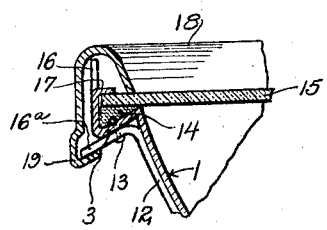
Figure 3 is a fragmentary sectional view through the rim portion of the light.

In constructing the light I provide a body 1 which is of substantially hemispherical shape, this body being preferably formed of aluminum, the lower portion of the inner surface 2 of which is polished to provide a reflecting surface $2^a$. The upper portion $2^b$ of the inner face 2 of body 1 is hammered to provide a plurality of relatively small faces $2^c$ which are disposed at various unpredetermined angles with respect to each other. These faces $2^c$ act to effectually disperse and break up the light rays at the upper portion of body 1 thus eliminating any possibility of a blinding beam of light being projected from the upper portion of inner surface 2 of body 1 at such a height as to blind the driver of an approaching automobile, while permitting the light rays to be projected in a beam from the lower portion of the body so as to effectively illuminate the roadway in advance of the automobile.

Body 1 is provided, at its forward portion, with an annular outwardly and rearwardly inclined flange 3. An annular reinforcing plate 4 is secured, by means of rivets 5, or in any other suitable or preferred manner, to the rearward portion of body 1 centrally thereof. This plate is provided with a cylindrical sleeve 6 which fits snugly about a nipple 7 extending from body 1, this nipple receiving a plug 8 provided in its inner end with a socket for reception of the stem of bulb 9, plug 8 being provided in its outer end with suitable openings for reception of contact elements carried by an outer plug 10 to which is connected a cord 11 carrying wires to the opposite sides of a suitable source of electrical energy. Arms 12 extend from plate 4 and are secured at their forward ends, by means of rivets 13, or in any other suitable or preferred manner, to flange 3, these arms fitting snugly about body 1 and serving to reinforce and support the same. The sleeve 6 is adapted to be received in a suitable bracket (not shown) for mounting the headlight on an automobile.

A packing ring 14 of rubber or other suitable material is secured in any suitable or preferred manner to the front face of flange 3 and acts as a cushioning element for a lens or glass closure plate 15 extending across the front of body 1. This lens 15 is secured in position by means of a ring 16 extending forwardly from flange 3, which ring 16 is slit to form retaining tabs 17 which are bent inwardly to engage the outer face of lens 15 for securing the lens in position. To give a neat appearance to the headlight I provide a sheet metal rim 18 which extends about ring 16 and has its forward edge pressing against the outer face of lens 15. This rim is provided, at its rearward edge, with securing elements 19 of substantially U-shape in cross-section, these elements being adapted to fit snugly about portions $16^a$ of arms 12, which project beyond flange 3 for that purpose, for securing the rim in position. Elements 19 are provided with recesses or cut-outs $3^a$ which permit the portions $16^a$ to pass through the flange, after which the rim 18 is turned so as to move members 19 into engagement with members $16^a$. Members 19 are also preferably provided with rearwardly projecting elements 20 which are arranged in pairs and are disposed to receive between them the projecting portions $16^a$ of the arms 12 thus locking the rim against casual displacement. This provides simple and efficient means whereby the rim may be quickly and easily secured in position.

The light constructed in the manner illustrated and described may be readily produced at small cost and presents a neat and attractive appearance, as well as being of inexpensive construction and consisting of but few parts. In addition, by hammering the upper portion $2^b$ of the inner portion 2 of body 1 I provide simple and inexpensive means for effectually breaking up and dispersing the light rays projected from the upper portion of the reflecting surface of the body thus eliminating all possibility of a blinding beam of light being projected from the upper portion of body 1 into the eyes of the driver of an approaching automobile.

What I claim is:—

In a headlight of the character described, an aluminum body of approximately hemispherical shape having one portion of its inner face polished to provide a reflecting surface, the other portion of the inner face of said body being hammered to provide a plurality of minute reflecting surfaces disposed at various unpredetermined angles with respect to each other and acting to break up and diffuse the light rays to prevent the projection of a shaft of light from said hammered portion of the inner face of the body.

In testimony whereof I affix my signature.

WILLIAM H. STURGEON, Jr.